United States Patent

Welles, II et al.

[11] Patent Number: 5,864,315
[45] Date of Patent: Jan. 26, 1999

[54] VERY LOW POWER HIGH ACCURACY TIME AND FREQUENCY CIRCUITS IN GPS BASED TRACKING UNITS

[75] Inventors: Kenneth Brakeley Welles, II, Scotia; Richard Louis Frey, Delanson, both of N.Y.

[73] Assignee: General Electric Company, Schenectady, N.Y.

[21] Appl. No.: 833,564

[22] Filed: Apr. 7, 1997

[51] Int. Cl.$^6$ ................................. G01S 5/02; G01J 5/00
[52] U.S. Cl. ............................................... 342/357; 331/66
[58] Field of Search ................................. 342/357; 331/66

[56] References Cited

U.S. PATENT DOCUMENTS

| 5,594,453 | 1/1997 | Rodal et al. | 342/357 |
| 5,654,718 | 8/1997 | Beason et al. | 342/357 |

*Primary Examiner*—Mark Hellner
*Attorney, Agent, or Firm*—Marvin Snyder; Douglas E. Stoner

[57] ABSTRACT

A direct sequence spread spectrum signal processing system permits the receiver to be turned off during most of the acquisition phase of reception to significantly reduce the on time of the associated receiver front end. Power requirements are further reduced by use of very low power high accuracy time and frequency circuits in GPS based tracking units. The microprocessor based GPS tracking system is shut down almost all the time, using extremely little electrical power, and is powered up for very short periods of time at scheduled intervals by an extremely low power clock circuit with accuracy that varies with temperature. Each time the microprocessor is powered up, system temperature is recorded in memory. At times when the microprocessor is powered up, the GPS system is accessed and the GPS standard time is read. The difference between the low power clock circuit based time and the GPS based time is correlated with the recorded temperature history. A correction table, built from this data, provides a temperature history based correction to the low power clock based circuit without reference to the GPS system, and provides a highly accurate time standard. An additional table constructed in the microprocessor temperature compensates the local frequency standard used for frequency synthesis in satellite communication channels. This table is constructed by measuring offset between the calculated and actual synthesized frequency required to lock onto the satellite transmitted reference (pilot tone), and correlating this measured offset with the system ambient temperature.

12 Claims, 4 Drawing Sheets

VERY LOW POWER HIGH ACCURACY TIME AND FREQUENCY CIRCUITS IN GPS BASED TRACKING UNITS

BACKGROUND OF THE INVENTION

1. Field of the Invention

The present invention generally relates to time and frequency generation for communications systems and, more particularly, to low-power, low-cost and high accuracy time and frequency circuits in Global Positioning System (GPS) based tracking units.

2. Background Description

A preferred application of the present invention is the locating and tracking of assets such as rail cars, shipping or cargo containers, trucks, truck trailers, and the like, using the GPS. In such application, the GPS receivers are usually battery powered since an independent source of power is generally not available. It is advantageous to increase the operating life of the batteries by reducing the energy consumed by the GPS receiver.

In the present invention, a direct sequence spread spectrum (DSSS) communication system is used. In a typical spread spectrum receiver, the receiver front end (i.e., RF and IF electronics) consumes a large amount of power while it is turned on. This results in high energy consumption if the signal acquisition and synchronization take a long time.

A typical GPS receiver performs the following for each of at least four satellite signals:

1) acquires the DSSS signal,
2) synchronizes with the message data sequence (the NAV data stream) and reads the satellite time-stamp, clock-correction, ionospheric-delay and ephemeris data,
3) calculates the satellite position from the ephemeris data,
4) reads its own receiver clock to determine the receiver time associated with the reception of the time-stamp epoch, and
5) estimates the signal travel time by subtracting the time-stamp value from the associated receiver time.

This time difference is multiplied by the speed of light to obtain an estimated range to the satellite. If the GPS receiver had a clock that was perfectly synchronized with the clocks of the satellites (or the error was known), only three such range estimates would be required to precisely locate the receiver. There is, however, a clock-bias (slowly changing error) due the fact that GPS receivers typically use inexpensive crystal clocks, whereas the satellites are equipped with atomic clocks. This clock bias is learned and its effect eliminated by measuring the range (travel time) from four GPS satellites and using these measurements in a system of four equations with four unknowns (receiver x, y, and z, and time).

In one system in which the invention is implemented, a central facility or station must track multiple assets (e.g., railcars). Each tracked object carries a GPS receiver that processes data from several of the visible GPS satellites; however, an accurate position determination is not made at the receiver. Instead, only partial processing is done at the receiver and intermediate results are transmitted from the asset to the central station. These intermediate results do not require decoding of navigational or other data from the GPS signals. This system thus allows the GPS receiver and signal processor to be powered only long enough to acquire the satellite signals (determine the satellite/code-offset/Doppler, or SCD, bins). With this system, the dominant energy consumer is the acquisition process, and the GPS receiver energy used at each tracked asset will be dramatically reduced if the signal acquisition time and energy are dramatically reduced.

SUMMARY OF THE INVENTION

The invention provides very low power high accuracy time and frequency circuits in GPS based tracking units. A microprocessor based GPS tracking system is shut down almost all the time. In the shut-down state (or sleep mode), extremely little electrical power is used. The microprocessor is powered up for very short periods of time at scheduled intervals. The system powering up the microprocessor is an extremely low power clock circuit with an accuracy which varies with temperature. Each time that the microprocessor is powered up, the temperature of the system at that time is recorded in memory. At various times (but not every time) when the microprocessor is powered up, the GPS system is accessed, and the GPS standard time (a very accurate clock, within microseconds of absolute time) is read. The difference between the low power clock circuit based time and the GPS based time is correlated with the recorded temperature history. A correction table is built from this data. The correction table can then be used to provide a temperature history based correction to the low power clock based circuit without reference to the GPS system, and provide a highly accurate time standard.

An additional table is constructed by the microprocessor for temperature compensation of variation in the local frequency standard used for frequency synthesis in satellite communication channels. This table is constructed by measuring the offset between the calculated and the actual synthesized frequency required to lock onto the satellite transmitted reference (pilot tone), and then correlating this measured offset with the ambient temperature of the system.

In the system for locating and tracking of assets such as rail cars, shipping or cargo containers, trucks, truck trailers, and the like, using the GPS as generally described above, an additional source of power consumption is the power and time taken to acquire the reference frequency (the satellite pilot tone) for the communication channel. By automatically correcting for temperature drift of the local frequency synthesizer before turning it on, the time and power required for locking onto the pilot tone is reduced, and possibly eliminated altogether.

In addition to creating tables for temperature compensation, tables may also be created for power supply voltage variation compensation. It is also possible to use the same technology to construct an algorithmic representation of the dependencies of time and frequency on voltage, temperature and temperature history, and to use these algorithms for time and frequency corrections and compensations. The process of constructing and updating the tables or algorithms is an ongoing process over the life of the tracking unit. Thus, the invention provides adaptation to aging effects or mechanical stress (shock induced) effects, and assures continued accuracy of the tracking units over an indefinite life.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
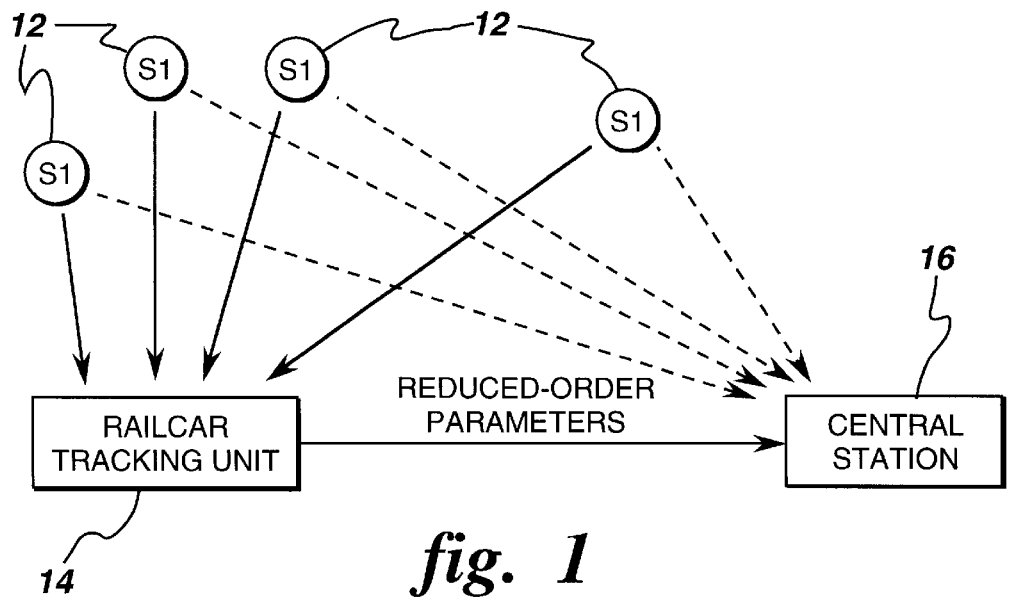
FIG. 1 is a block diagram of a remote tracking system in accordance with the present invention.

FIG. 1 illustrates a plurality of GPS satellites 12, an object being tracked (asset), such as a rail car carrying a tracking unit 14, and a central station 16. As described earlier, each satellite 12 transmits a signal that a GPS receiver in tracking unit 14 uses to measure the propagation delay (and delay rate, if asset velocity is desired) from that satellite to the receiver antenna. The satellite signals also include the periodically repeating NAV data that is needed to determine a navigation solution from the measured time delays. Because of the low rate (50 bits per second) of the NAV data in the GPS signal, a receiver must be active for a substantial period of time (approximately one minute) if the NAV data is to be collected. Furthermore, a particular satellite's NAV data changes over time and the GPS central station 16 monitors these changes and provides nearly hourly updates to the NAV data. To insure accurate navigation solutions, any GPS based navigation system must use NAV data that is no more than about four hours old. If the asset positions are to be monitored more frequently than every four hours, then new NAV data must be collected at least every four hours. NAV data maintenance then requires an approximate average of fifteen seconds of receiver operation per hour, and this entails a significant energy expense if done at each tracked asset.

The navigation solution is not calculated at the asset but is instead calculated at the central station. None of the NAV data is needed at the tracked asset. Only data relating to the GPS signal propagation delay between each satellite and the asset need be measured at the asset, and this data is then sent to the central station. The NAV data can be determined at central station 16 by utilizing a standard GPS receiver there, or by communicating with an appropriately located standard GPS receiver. If desired, the NAV data, or the navigation solutions could be communicated to the tracked assets via a higher rate communication link that would require less energy to receive at the asset. With no NAV data decoding needed at the asset, GPS signal acquisition becomes the main GPS processing task at the asset, and the feasibility of the centralized tracking system is greatly enhanced by the lowenergy acquisition methods of the present invention.

Figure 2:
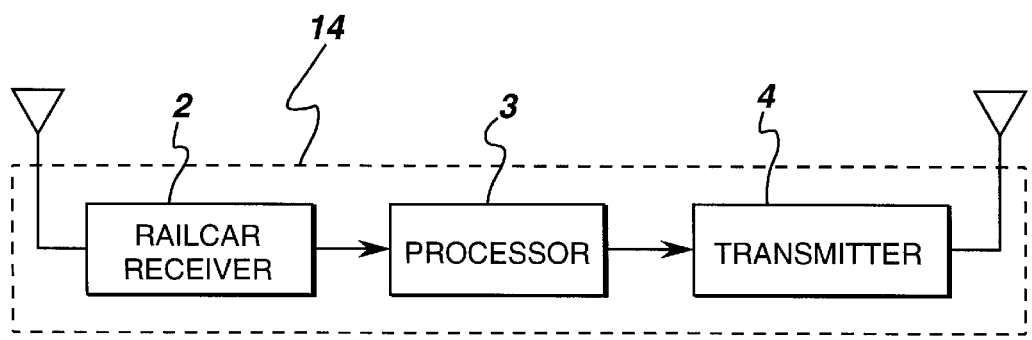
FIG. 2 is a block diagram of a tracking unit carried on an object to be tracked, in accordance with the invention.

As shown in FIG. 2, a rail car tracking unit 14 is actually comprised of a receiver 2 responsive to the signals from GPS satellites 12, a processor 3, and a transmitter 4. The received signals are processed in processor 3 to ascertain and utilize propagation time differences among the signals received from the GPS satellites 12. By utilizing time differences, the need for knowledge of the GPS signal time-stamps (or GPS signal transmission times) at the asset is alleviated, and data stream decoding is therefore unnecessary at the asset. With no need for GPS data stream decoding, the receiver process reduces to acquisition of the GPS signals and calculating the relevant time differences (and Doppler frequency differences, if asset velocities are to be determined) from the acquisition results. The calculated time differences, and data identifying the satellites associated with the differences, are transmitted by transmitter 4 to the central station.

Figure 3:
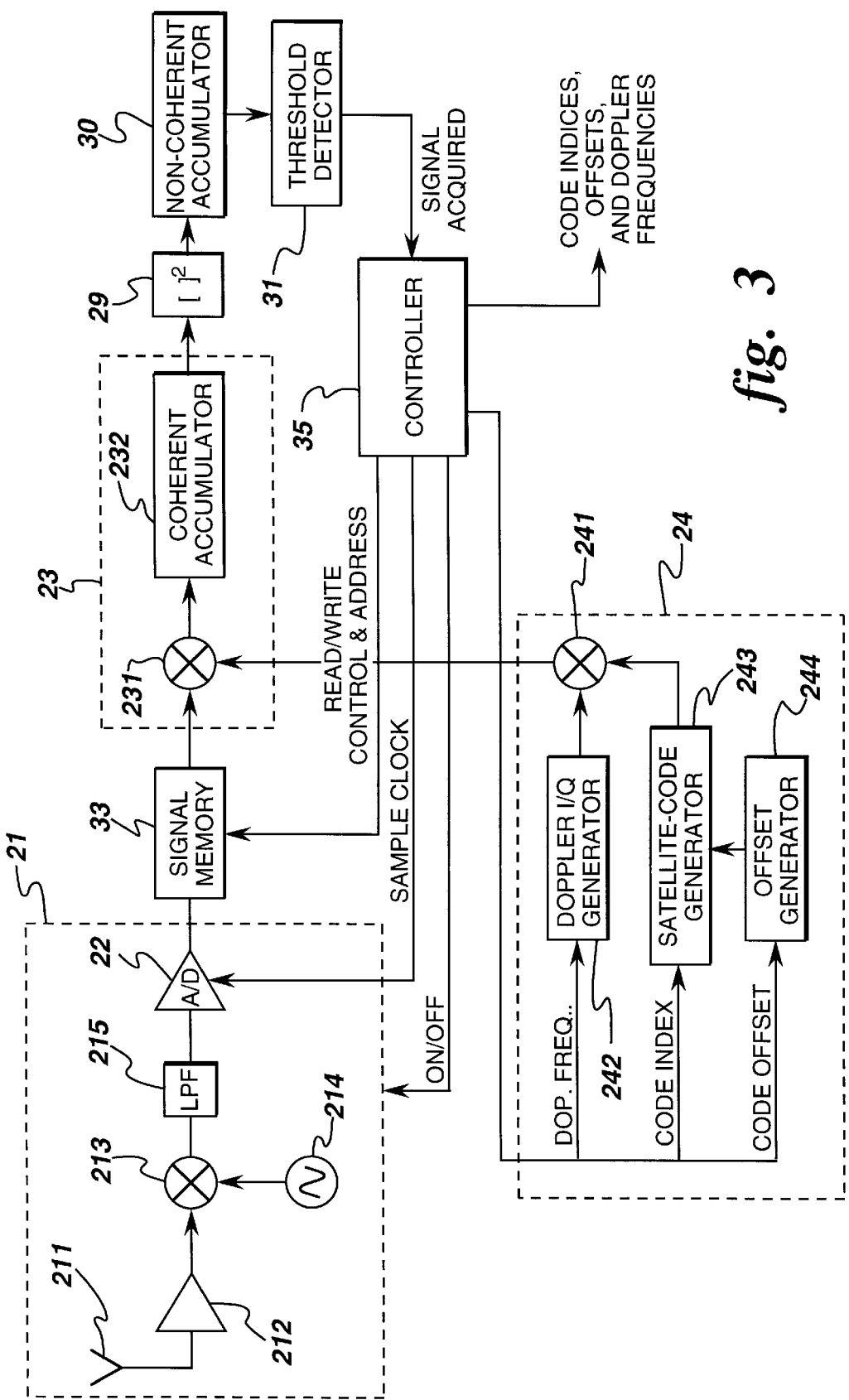
FIG. 3 is a block diagram of a sequential signal processing system in which the present invention may be implemented.

FIG. 3 shows a serial acquisition GPS receiver in which the present invention may be implemented. In a conventional GPS receiver, signal acquisition is followed by carrier and P/N code synchronization and NAV data demodulation, but modules for these processes are not shown in FIG. 3. The signal acquisition architecture comprises an RF/IF section 21 including an antenna 211, an RF amplifier 212, a mixer 213 and local oscillator 214, and a low pass filter 215 which supplies a received and down-converted signal to an analog-to-digital (A/D) converter 22 running at an integer multiple of the code chip rate. The A/D converter 22 typically samples and converts at an integer multiple of the replica course/acquisition (C/A) code chip rate and provides a digital sequence to a serial digital correlator 23. Correlator 23 serially computes the inner product of a digitized receiver-output subsequence from A/D converter 22 and a C/A replica code subsequence from replica generator 24. The inner product is performed serially by first multiplying the first terms of the two sub-sequences in multiplier 231 and storing the result in coherent accumulator 232, then multiplying the second terms of the two sub-sequences and adding this to the coherent accumulator 232, etc. The inner product is performed in real time, as sub-sequence terms become available from A/D converter 22. As is conventional, the sub-sequences usually span a single period of the repeating C/A code. After an inner product is computed, the coherent accumulator contains a sample of the cross correlation of the received sub-sequence with one C/A code cycle of the replica signal, for the particular C/A code, code-offset and Doppler frequency generated by the replica generator. The inner product operation is repeated with several following sub-sequences from A/D converter 22 while using the same replica C/A code sub-sequence. The subsequent inner product results are then squared by a squarer 29 and summed in a non-coherent accumulator 30, yielding a non-coherent integration of the coherent processing results. The output signal of non-coherent accumulator 30 is examined by a threshold detector 31 and a "signal acquired" command is generated if the level in non-coherent accumulator 30 is sufficiently high. When a signal is acquired, a controller 35 notes the associated C/A code index (satellite index), code offset, and Doppler frequency for output, and commands replica generator 24 to either change to a different C/A code (for a different GPS satellite) and begin another search, or to stop if sufficient satellite signals have been acquired. If a signal is not acquired after the several sub-sequences from A/D converter 22 have been processed, then controller 35 commands replica generator 24 to change to a different C/A code, code offset, or Doppler frequency. As each satellite signal is acquired, controller 35 supplies the associated code index, code offset and Doppler frequency to GPS signal synchronization and NAV data processing units (not shown).

Provision for searching all feasible C/A codes, code offsets and Doppler frequencies must be provided. Controller 35 selects the desired C/A code and code offset through commands to a satellite-code generator 243 and an offset generator 244. Offset generator 244 provides for a time offset of the generated code replica from satellite-code generator 243, relative to the output data stream from A/D converter 22. A Doppler I/Q generator 242 generates a digital representation of the sinusoid representing the combination of Doppler shift and local-oscillator frequency error assumed by controller 35. The replica signal is generated as the product of this sinusoid and the C/A code replica. To insure detection of the GPS signal, the RF/IF section must generate both an in-phase (I) and a quadrature (Q) output signal (not shown in FIG. 3), and the two signals must be processed for signal acquisition. Furthermore, each of the I and Q RF/IF output signals must be processed with both the I and Q Doppler sinusoidal components, as is known by those skilled in the GPS art.

Conventional GPS receivers require the receiver output data from RF/IF section 21 to be processed as soon as it is available, and processing is constrained by the code rate in the received signal. The system as shown in FIG. 3 provides a signal-storage memory 33, and power to RF/IF section 21 is controlled by controller 35. The GPS signal output from RF/IF section 21 is converted to digital format by A/D converter 22, but now the A/D sampling rate is set at a low non-integer multiple of the C/A code rate. Memory 33 stores a length of input signal sufficient for signal acquisition and allows the RF/IF section to be turned off after storage. Furthermore, acquisition processing is no longer constrained by the code rate of the received signal, as noted in the prior art. The non-integer A/D sampling rate allows the acquisition processor to determine accurate GPS signal propagation time differences, needed for the centralized tracking system of the invention, without the conventional carrier and P/N code synchronization processes (e.g., the Costats phase locked loop for carrier tracking, and the early-late delay locked loop for code tracking). This architecture will consume less energy than the conventional architecture because signal reception beyond the acquisition phase is avoided, and this allows RF/IF section 21 to be turned off after storing just enough received signal for accurate acquisition.

When the required data has been sampled, converted, and stored, the receiver can be turned off and the recorded data can be processed. In the sequential method described, the stored data is replayed (read) once during the correlation process for each combination of code, code offset, and Doppler shift. In the system of FIG. 3, the sequence of stored digital data samples is read from memory 33 one at a time. Each sample of the sequence from memory 33 is multiplied, in multiplier 231, by the corresponding sample of the sequence from replica generator 24 and the result is stored in coherent accumulator 232. The sequence from the replica generator is crafted for a particular code, code offset, and Doppler frequency under test. The length of the memory sequence so processed is the coherent integration length, and is typically chosen as one full cycle of the C/A code, which is 1.0 milliseconds. Several (e.g., twenty) adjacent 1.0 millisecond memory segments are processed in this manner without changing the replica sequence. After each 1.0 millisecond segment is processed, the value stored in coherent accumulator 232 represents the cross correlation between the 1.0 ms replica and data sequences. This value is squared by squarer 29 and added to non-coherent accumulator 30. Before the first 1.0 ms segment is processed for a given replica signal, non-coherent accumulator 30 is reset to zero so that the final accumulated result represents the total correlation score for the particular code, code offset, and Doppler frequency specified by the replica signal. Similarly, the coherent accumulator is reset before each 1.0 ms segment is processed. Threshold detector 31 monitors the correlation score and produces a "signal acquired" signal if the score is larger than a specified threshold. Upon receipt of a signal acquired signal, controller 35 performs a simple peak-search and interpolation algorithm (described later) to find the best estimate of the code offset associated with the given code index and Doppler frequency under examination. Controller 35 then selects another code, code-offset, and Doppler frequency combination and commands replica generator 24 to alter the replica signal to reflect this change. The signal acquisition process is repeated for multiple replica signals corresponding to the codes, code offsets, and Doppler frequencies to be searched, and is stopped when the desired number of GPS signals (different C/A codes) have been acquired. Controller 35 then supplies the code indices, estimated offsets, and Doppler frequencies associated with the acquired signals.

The I and Q memory data can be processed sequentially, (e.g., process all I data, then process all Q data) using one digital correlator 23, as shown in FIG. 3. Alternatively, the I and Q memory data can be processed simultaneously using separate digital correlators. In either case, to insure signal acquisition, I and Q Doppler processing must be performed on both the I memory data, and the Q memory data. Thus there are four I–Q combinations and they can be processed sequentially, with a single digital correlator, or simultaneously with multiple correlators. In one sequential method, the correlation result for the full memory data sequence with a given replica code index, code offset, and Doppler frequency is calculated as follows: First, the coherent and non-coherent accumulators are reset to zero. Then the I memory data is processed with the I Doppler replica and the correlation result accumulated in coherent accumulator 232, then the Q memory data is processed with the Q Doppler replica and the correlation result is further accumulated in the coherent accumulator. The total coherent-accumulation result is then squared by squarer 29 and added to non-coherent accumulator 30. The coherent accumulator is then reset. Next the Q memory data is processed with the I Doppler replica and the correlation result accumulated in the coherent accumulator, then the I memory data is processed with the Q Doppler replica and the correlation result is inverted (multiplied by −1) and further accumulated in the coherent accumulator. The total coherent-accumulation result is then squared by squarer 29 and added to non-coherent accumulator 30. This process is repeated for each 1.0 ms memory data segment without resetting the non-coherent accumulator between segments, and requires two full read cycles of both the I and Q memory data. Acquisition time and energy can be reduced by using separate I and Q Doppler generators 242, multipliers 241, and digital correlators 23 to process all four I–Q combinations simultaneously.

The total acquisition time can be reduced by processing multiple code offsets simultaneously. For example, multiple digital correlators 23 can be used, each being driven with a differently delayed version of the replica signal. The different delays can be implemented with a tapped delay line (not shown) coupled to the output of replica generator 24. The different taps can then each drive a separate serial digital correlator 23, and the results from each correlator can be separately squared and accumulated in associated elements of a non-coherent accumulator array.

From the foregoing, it will be appreciated that the basic design of the tracking system is keyed to reducing energy consumption by reducing acquisition time. Further improvements can be made by providing a highly accurate clock in the tracking unit; however, an inexpensive crystal clock is typically used in the tracking unit, since keeping costs at a minimum is a major requirement of the system design.

Figure 4:
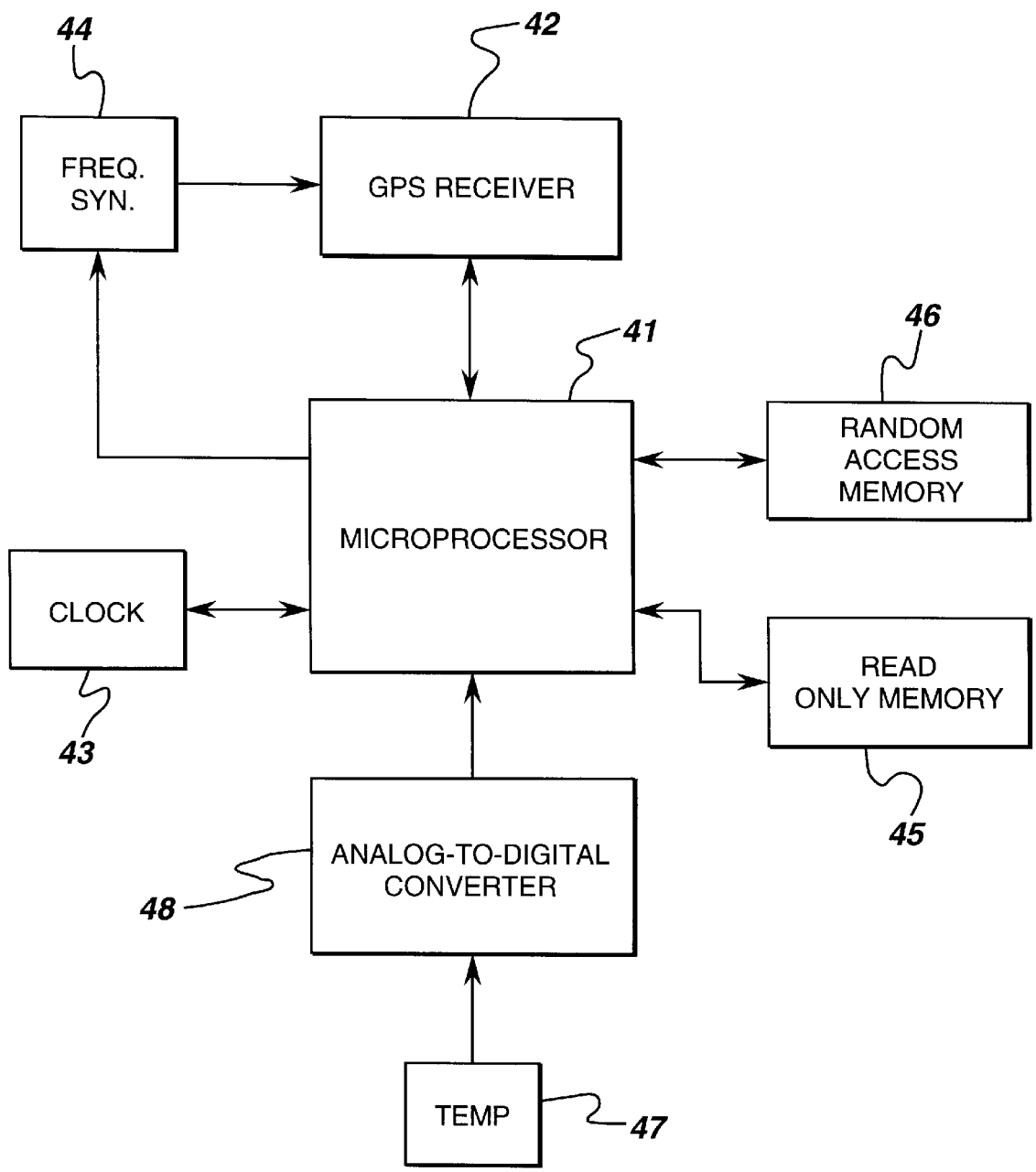
FIG. 4 is a block diagram of low-power, high accuracy time and frequency circuits according to the present invention.

According to the invention, a low cost, low power clock and tuning frequency synthesizer, as generally illustrated in FIG. 4, may be used in the tracking unit. This clock and tuning frequency synthesizer comprises a microprocessor 41, a GPS receiver 42, a local clock 43, and a local frequency standard or synthesizer 44. Microprocessor 41 communicates with a read only memory (ROM) 45 and random access memory (RAM) 46. ROM 45 stores a control program which controls microprocessor 41 to calculate and store tables of data and preserves this data in RAM 46 while the computer is in a very low power "sleep" mode. For this purpose, RAM 46 is, for example, a static RAM (SRAM) or battery powered RAM to maintain the data stored therein.

The control program in ROM 45 causes microprocessor 41 to be powered up for very short periods of time at scheduled intervals. This is accomplished by accessing clock 43, which is an extremely low power clock circuit with an accuracy which varies with temperature. Each time that microprocessor 41 is powered up, temperature of the system at that time is sensed using a temperature sensor 47 and analog-to-digital converter 48, and is recorded in memory 46. At various times (but not every time) when the microprocessor is powered up, GPS receiver 42 is accessed, and the GPS standard time is read. The difference between low power clock circuit 43 based time and GPS receiver 42 based time is correlated with the recorded temperature history in RAM 46. A correction table is built from this data and stored in RAM 46. The correction table can then be used to provide a temperature history based correction to the low power clock based circuit without reference to the GPS system, and to provide a highly accurate time standard.

An additional table is constructed by microprocessor 41 for temperature compensation of variation in the local frequency standard used for frequency synthesis in satellite communication channels. This table is constructed by measuring the offset between the calculated and the actual synthesized frequency required to lock onto the satellite transmitted reference signal (pilot tone), and then correlating this measured offset with the ambient temperature of the system. By automatically correcting for temperature drift of local frequency synthesizer 44 before turning it on, the time and power required for locking onto the pilot tone is reduced, and possibly eliminated altogether.

In addition to creating tables for temperature compensation, tables may also be created for power supply voltage variation compensation. It is also possible to use the same technology to construct an algorithmic representation of the dependencies of time and frequency on voltage, temperature and temperature history, and to use these algorithms for time and frequency corrections and compensations. The process of constructing and updating the tables or algorithms is an ongoing process over the life of the tracking unit. Thus, the invention provides adaptation to aging effects or mechanical stress (shock induced) effects, and assures continued accuracy of the tracking units over an indefinite life.

Figure 5:
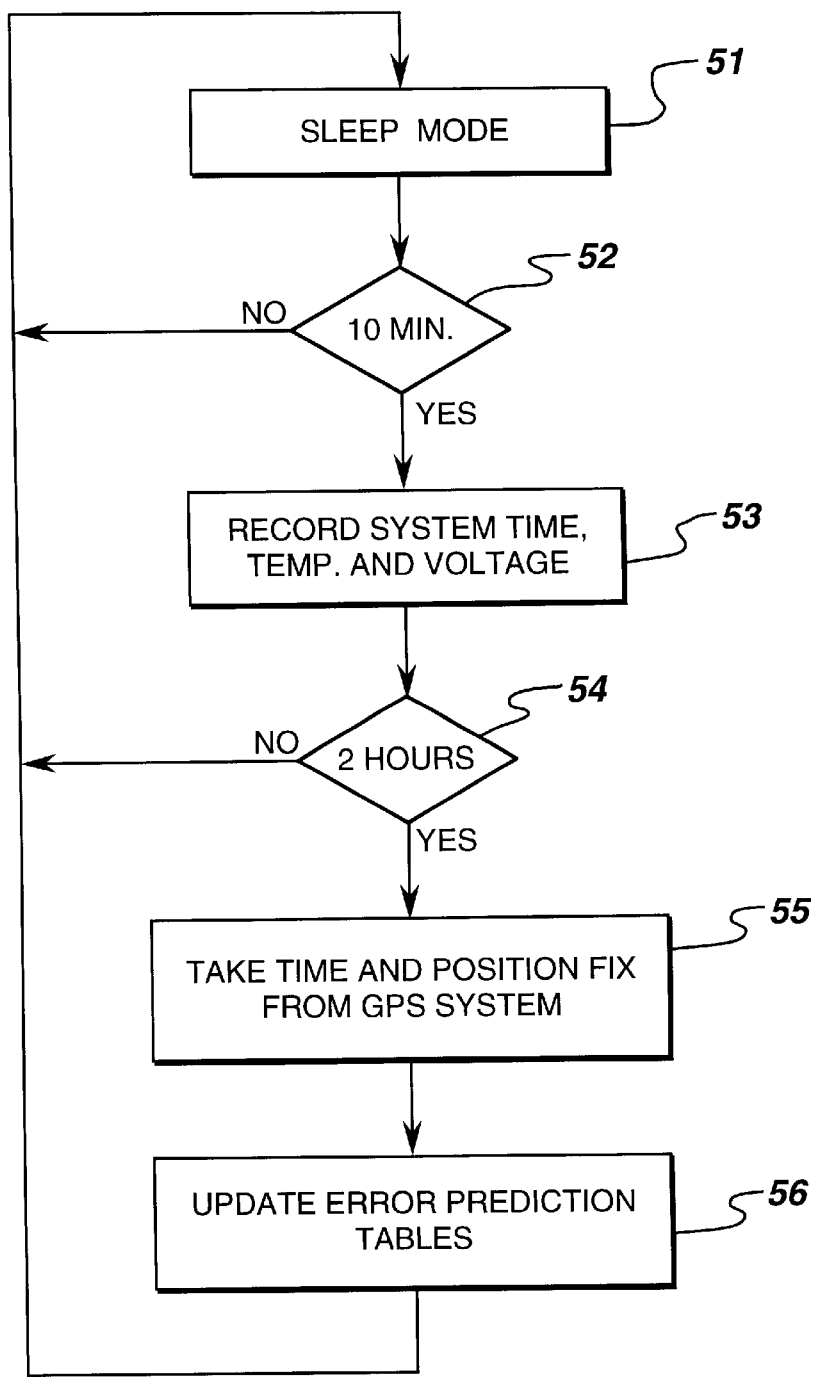
FIG. 5 is a flow chart illustrating operation of the microprocessor based circuits of FIG. 4.

The process by which the circuits of FIG. 4 operate is illustrated in FIG. 5. The microprocessor is initially in the sleep mode at step 51. Periodically (once every ten minutes, for example), as detected at step 52, the microprocessor "wakes up", records system time, temperature, and voltage in a table of time, temperature and voltage data, and then reverts to the sleep mode.

At less frequent intervals (once every two hours, for example), as detected at step 54, the microprocessor wakes up, takes time, temperature and voltage data as before, and also takes a time and position fix from the GPS system, as indicated at step 55. The procedure for taking this fix is to tune to the correct receiving frequency as accurately as possible. The length of time that the GPS receiver is turned on to take this fix varies with the accuracies of time and frequency generated and stored locally. Very accurate time and frequency means a fix occurs quickly, reducing the time that the GPS receiver is on and, therefore, the energy required to perform the fix.

When the fix occurs, information is available which tells the correct frequency and time, as opposed to what the microprocessor had determined as the correct time and frequency at the start of the fix. The error in time and frequency is due to drift of the local clock and frequency standard. This drift, or error, is due to several things, including temperature, voltage, component aging and drift, and mechanical shock, causing changes to components. The error prediction tables are updated at step 56, and the microprocessor then returns to the sleep mode.

The clock error is due mainly to the temperature and voltage history which the clock experiences between the immediately previous fix and the present fix. By correlating the measured error with the temperature and voltage history stored at each ten minute "wake up" interval, the microprocessor can predict with increasing accuracy what the clock correction should be, based on the temperature and voltage history at the next fix. Successive updating of the error prediction table continues to increase clock accuracy over the life of the system, and it can be seen to also compensate for changes in circuit component value due to drift, aging and mechanical shocks.

The receiving frequency is generated by frequency synthesizer 44 (FIG. 4) which is based on a local frequency standard. Accuracy of the local standard is based mainly on the current temperature and voltage, as well as circuit component value changes over time. By correlating the measured error in frequency to the present values of temperature and voltage, microprocessor 41 (FIG. 4) can predict with increasing accuracy what the frequency correction should be, based on temperature and voltage at the next fix. Successive updating of the error prediction table continues to increase frequency accuracy over the life of the system, and it can be seen to also compensate for changes in circuit component value due to drift, aging or mechanical shocks.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A low power, high accuracy clock circuit for a GPS tracking system comprising:

a microprocessor controlled by a control program and normally being in a low power "sleep" mode;

a local clock providing local time data to the microprocessor;

a memory for storing data for later access by the microprocessor and for preserving data while the microprocessor is in the "sleep" mode;

temperature sensing means controlled by the microprocessor for sampling system temperature, the microprocessor being adapted to periodically store time and system temperature data in the memory; and a GPS receiver controlled by the microprocessor to periodically turn on and supply data to the microprocessor, the microprocessor being controlled by the control program to detect a difference between the local clock time and a GPS based time and to construct a correction table of correlated temperatures and time differences for storage in the memory, the microprocessor being adapted to access the correction table to provide a temperature history based correction to the local clock.

2. The system according to claim 1 wherein the microprocessor is adapted to additionally sample system voltage and store voltage data with the time and system temperature data in the memory, and is further adapted to construct a second correction table of correlated voltages and time differences, the second correction table being stored in memory for access by the microprocessor to provide voltage history based correction to the local clock.

3. The system according to claim 1 further comprising a local frequency synthesizer for generating a signal used to acquire a satellite pilot tone and wherein the microprocessor is further adapted to construct a second correction table of correlated temperatures and frequency differences by measuring an offset between a calculated and an actual synthesized frequency required to lock onto the satellite pilot tone, the microprocessor being further adapted to be controlled by the control program to correct for temperature drift of the local frequency synthesizer before turning on the local frequency synthesizer, thereby minimizing the time and power required for locking onto the satellite pilot tone.

4. The system according to claim 3 wherein the microprocessor is adapted to additionally sample system voltage and store voltage data with the time and system temperature data in the memory, and is further adapted to construct a third correction table of correlated voltages and frequency differences, the third correction table being stored in memory for access by the microprocessor to provide voltage history based frequency correction to the frequency synthesizer.

5. A low power, high accuracy clock circuit comprising:
a microprocessor controlled by a control program and normally being in a low power "sleep" mode;
a local clock providing local time data to the microprocessor;
a memory for storing data for later access by the microprocessor and for preserving data while the microprocessor is in the "sleep" mode;
temperature sensing means controlled by the microprocessor for sampling system temperature, the microprocessor being adapted to periodically store time and system temperature data in the memory; and
an external source of accurate time periodically supplying accurate time data to the microprocessor, the microprocessor being controlled by the control program to detect a difference between the local clock time and the accurate time data and to construct a correction table of correlated temperatures and time differences for storage in the memory, the microprocessor being adapted to access the correction table to provide a temperature history based correction to the local clock.

6. The system according to claim 5 wherein the microprocessor is adapted to additionally sample system voltage and store voltage data with the time and system temperature data in the memory, and is further adapted to construct a second correction table of correlated voltages and time differences, the second correction table being stored in memory for access by the microprocessor to provide voltage history based correction to the local clock.

7. A method of generating highly accurate local time data using a clock circuit comprising the steps of:
periodically recording, at regular intervals, local time and temperature data;
at intervals less frequent than said regular intervals, periodically accessing an external accurate time source;
building and storing a table of clock errors versus a history of temperature; and
accessing the table to correct the local time as a function of present temperature.

8. The method of claim 7 further comprising the steps of:
periodically recording system voltage data;
building and storing a second table of clock errors versus a history of voltage; and
accessing the second table to correct the local time as a function of present voltage.

9. The method according to claim 7 further comprising the steps of:
generating a signal used to acquire a satellite pilot tone;
constructing a second correction table of correlated temperatures and frequency differences based on measured offsets between a calculated and an actual synthesized frequency required to lock onto the satellite pilot tone; and
accessing the second correction table to correct for temperature drift of the generated signal frequency.

10. The method according to claim 9 further comprising the steps of:
periodically sampling and recording system voltage;
constructing and storing a third correction table of correlated system voltages and frequency differences; and
accessing the third correction table to provide system voltage history based frequency correction to the generated signal.

11. A low power, high accuracy clock circuit for a GPS tracking system comprising:
a microprocessor controlled by a control program and normally being in a low power "sleep" mode;
a local clock providing local time data to the microprocessor;
a memory for storing data for later access by the microprocessor and for preserving data while the microprocessor is in the "sleep" mode;
voltage sensing means controlled by the microprocessor for sampling system voltage, the microprocessor being adapted to periodically store time and system voltage data in the memory;
a local frequency synthesizer for generating a signal used to acquire a satellite pilot tone; and
a GPS receiver controlled by the microprocessor to periodically turn on and supply data to the microprocessor, the microprocessor being controlled by the control program to construct, and store in memory, a correction table of correlated voltages and frequency differences obtained by measuring an offset between a calculated and an actual synthesized frequency required to lock onto the satellite pilot tone, the microprocessor being adapted to access the table to provide a voltage history based correction to the frequency synthesizer.

12. A method of generating highly accurate local time data using a clock circuit comprising the steps of:
generating a signal used to acquire a satellite pilot tone;
periodically sampling and recording system voltage;
constructing and storing a table of correlated system voltages and frequency differences based on measured offsets between a calculated and an actual synthesized frequency required to lock onto the satellite pilot tone; and
accessing the table to provide system voltage history based frequency correction to the generated signal.

* * * * *